Jan. 13, 1953  I. E. JONES ET AL  2,625,243
TRAILER AUTOMATIC BRAKE APPLYING MEANS
Filed Oct. 31, 1949
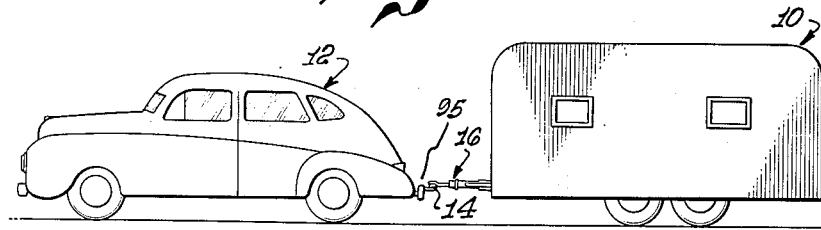
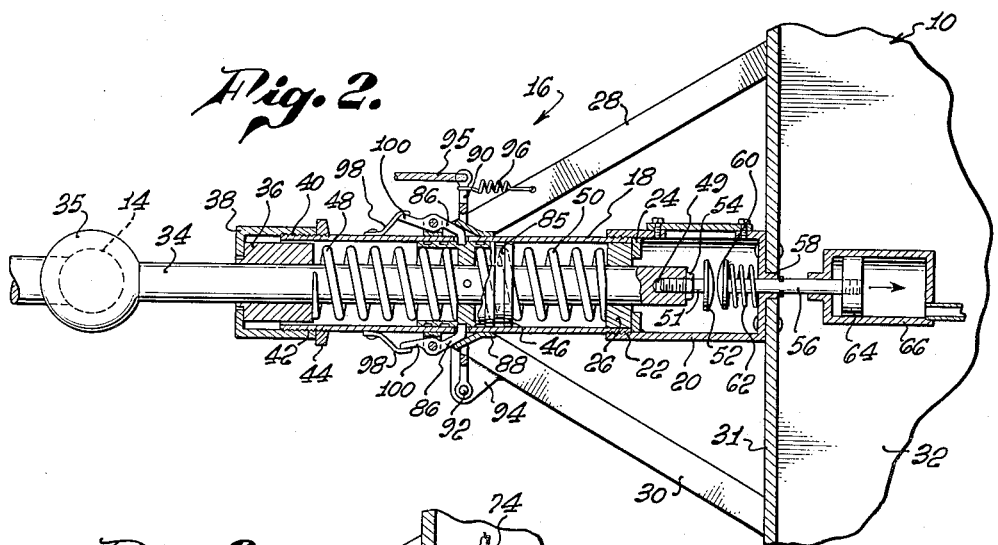
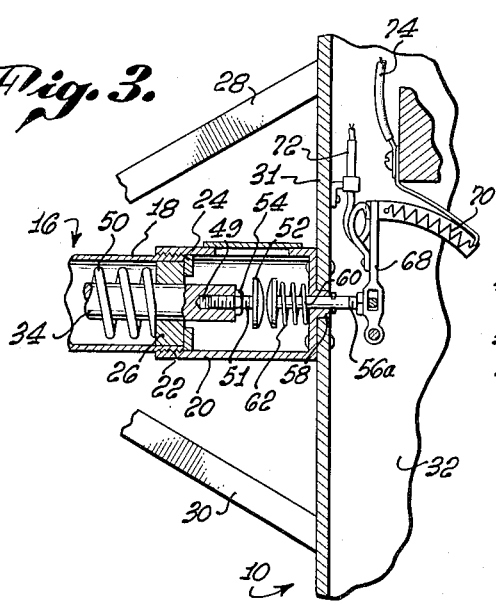
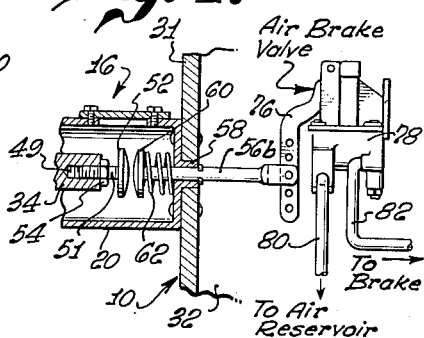
INVENTORS.
IVAN E. JONES,
CHARLES B. REYNOLDS
BY
ATTORNEY.

Patented Jan. 13, 1953

2,625,243

UNITED STATES PATENT OFFICE 2,625,243

TRAILER AUTOMATIC BRAKE APPLYING MEANS

Ivan E. Jones and Charles B. Reynolds, Orange, Calif.

Application October 31, 1949, Serial No. 124,702

3 Claims. (Cl. 188—112)

Our invention relates to braking and shock absorbing devices and particularly to such devices as are adapted to be incorporated in the draft connection or hitch between automobiles and trailers pulled by them.

Trailers are built in a great variety of forms from those intended to carry heavy loads, and, therefore are fitted with brake systems connected with the brake operating systems of the vehicle pulling the trailer, to the great numbers of smaller trailers ranging from small two wheeled vehicles intended to carry light loads to house trailers.

As the majority of the latter types of trailers are without brakes, the brakes of the automobile towing the trailer have to do the braking for both the automobile and the trailer. Even while driving carefully on good roads under normal weather conditions emergencies are likely to occur at any time in which a driver would much more easily avoid an accident if the trailer were equipped with brakes applied automatically, since the space in which the car and trailer must be stopped may not be sufficient because of the added weight of the trailer.

Very often the driver of an automobile will depend on the braking power of the engine when a temporary decrease in speed is called for, as for instance in slowing up for a curve in the road, but if pulling a trailer the momentum of the latter will push the automobile ahead and may cause the driver to swing wide on the curve because the speed of the automobile is greater than the driver was expecting if inexperienced in pulling a trailer, as is often the case.

Under the best circumstances the extra brake wear imposed on an automobile pulling a trailer without brakes soon wears them out unless the driver is thoroughly experienced, and even then will naturally cause more wear and put the driver in "tight spots" which would be avoided if the trailer were fitted with automatically operated brakes.

Even when a trailer is fitted with brakes of the kind controlled by the driver of the automobile and separate from those of the latter, the driver in an emergency may not have time, or may forget to apply the trailer brake.

A further point to be remembered by the driver of an automobile pulling a trailer is that in starting from a stop on an upgrade the weight of the trailer is pulling against the automobile and unless he accelerates his engine skillfully, the extra load may kill the engine.

A purpose of our invention is to provide a trailer connection incorporating automatically operated trailer brake applying means actuated whenever the weight of the trailer acts forwardly against the automobile pulling it.

Another purpose of our invention is to incorporate in a trailer brake applying means, resilient means effective to prevent sudden loads due to the inertia of the trailer, from being imposed on the engine of the towing automobile.

Yet another object of our invention is to provide means for applying the brakes of a trailer, which is fitted with brakes not operated by the driver, the means being built into the trailer connection or drawbar and automatically operated by the trailer whenever it tends to overrun the towing car.

Still further objects of our invention will become apparent from a study of the following description read with reference to the accompanying drawings which illustrate embodiments of the invention at present deemed preferable by us.

In the accompanying drawings:

Fig. 1 is a side view of a trailer connected, by the hitch or connecting means of our invention, to an automobile.

Fig. 2 is a horizontal section drawn on an enlarged scale through the hitching connection and showing means for applying hydraulic brakes on the trailer.

Fig. 3 is a fragmentary view similar to Fig. 2 but showing means for applying electric brakes on the trailer.

Fig. 4 is a fragmentary view similar to Fig. 2 but showing means for applying air brakes on the trailer.

In Fig. 1 the numeral 10 indicates a trailer of the house type which is generally fitted with brakes, although very frequently no brakes are fitted if the trailer is of a light type, the automobile brakes being relied on to serve the combination.

When the trailer is fitted with brakes, our invention can be utilized as auxiliary operating means as a safety measure, but the invention will be explained as applied to trailers not fitted with brakes operated from the automobile in order to avoid unnecessary complexity.

In Fig. 1 the automobile 12 is shown as provided with a generally used hitching element in the form of a ball 14 mounted on a bracket extending from the back cross frame member of the automobile. The hitching connection of the trailer, generally indicated at 16, is engaged with ball 14 in the usual manner as is well understood, but the hitch 16, incorporates the novel structure of our invention.

The hitch structure comprises a cylindrical member 18 mounted at its trailer end in a hollow base member 20, as for instance by a threaded connection therewith as indicated at 22, the trailer end of cylinder 18 being located against an inwardly projecting flange 24 of the base member.

The rearward or trailer end of cylinder 18 is provided with a wall 26 through which is drilled a central hole, the wall serving as a guide and abutment for parts later described.

The cylinder 18 is braced toward its forward end by angularly extending struts 28, 30 welded or otherwise secured at their forward ends to the cylinder and at their other ends to spaced points on the front cross frame member 31 of the trailer base frame 32.

A bar 34 having a cup 35 at its forward end fitting over ball 14 is arranged to extend axially through cylinder 18, a bearing block 36 being provided at the forward end of the cylinder, the rearward end of the bar extending through the central hole in wall 26. Block 36 is adjustably positioned by a centrally apertured cap 38 provided with an internal screw thread indicated at 40 by which the cap is screwed onto an external screw thread, indicated at 42, at the forward end of the cylinder. Cap 38 is locked in adjusted position by locknut 44. A piston 46 is secured to the bar 34 about midway of its length and the piston is resiliently held centered in the cylinder by coiled springs 48 and 50 arranged between the block 36 and the piston, and between wall 26 and the piston respectively. The springs 48 and 50 are mounted under compression, the degree of which may be adjusted for the weight of the trailer load by screwing cap 38 to a greater or less extent onto cylinder 18.

The end of the bar 34 projecting through wall 26 is drilled and tapped as indicated at 49, and a threaded stem 51 is mounted therein. The contact member 51 is provided with a wide head 52 and is locked in adjusted position by a locknut 54. The arrangement of the threaded stem 51 provides for varying the effective length of bar 34 as may be required consequent on adjustment of the tension of springs 48 and 50 by varying the extent to which cap 38 is screwed on cylinder 18.

A brake operating rod 56 (Fig. 2) is mounted axially with contact member 51, and mounted for sliding movement in a bearing 58 provided in the back wall of base member 20. Brake operating rod 56 is provided with a head 60, and is held normally projected toward contact member 50, by a light spring 62 arranged between head 60 and the rear wall of the base member.

The brake operating rod is shown in Fig. 2 as secured to the piston 64 of a master cylinder 66 of a hydraulic brake system fitted to the trailer. It will be evident that should the trailer tend to overrun the automobile, as for instance when the driver of the automobile suddenly applies his brakes, spring 50 would be compressed by forward movement of the cylinder, bringing head 52 against head 60 and the rod 56 will force piston 64 into master cylinder 66 thereby applying the trailer brakes to an amount dependent on the force exerted by the trailer.

In Fig. 3 the brake operating rod is indicated by 56a and is secured to an arm 68 moved by the rod 56a over a rheostat 70 of an electrical brake applying system, thus varying the amount of electrical energy supplied to the brake operating means from the battery lead 72 to the lead 74 connected to electrical brake applying means of any suitable kind.

In Fig. 4 the brake operating stem is indicated at 56b and is connected to the operating arm 76 of an air brake main valve 78. The pressure line to the valve 78 is indicated at 80 and the air supply line to the brakes is indicated at 82.

It is desirable to provide means to enable the bar 34 to be locked against movement relatively to cylinder 18 when it is necessary to back the trailer, and any suitable means for this purpose may be fitted and operated either from the outside or the inside of an automobile. The means to prevent movement of bar 34 relatively to cylinder 18 shown in Fig. 2, comprise a plurality of peripheral grooves 85 in the surface of piston 46, and a plurality of fingers 86 pivoted on cylinder 18. The fingers are provided with hooked ends adapted to be forced through openings in the cylinder wall into engagement with the grooves in the piston by means of a conical ring 88 sliding on the surface of the cylinder and engaging the sloped backs of fingers 86. Ring 88 is moved by a lever 90 having a ring shaped part surrounding ring 88, pivoted at 92 on a bracket 94 secured to bracing member 30, and engaging ring 88 by a pin and slot connection (not shown). Lever 90 is moved forward by a cable 95 carried into the driver's compartment with sufficient slack to prevent the cable from becoming taut due to movements of the trailer. A spring 96 holds the lever 90 normally in retracted position, and leaf springs 98 acting on projections 100 of fingers 86 normally hold the hooked ends of the fingers out of engagement with the grooves in the piston.

It will be noted that since operating rods 56, 56a, 56b are free to move rearwardly, the operation of the trailer brakes is not interfered with should the brakes be operable from the automobile, but the brakes will be automatically operated should the driver forget to, or not have time to apply the trailer brakes.

Trailers fitted with brakes do not need to have brake operating means carried through to the driver's compartment of the automobile if the automatic operating means of our invention are incorporated in the trailer connecting means.

A further advantage of our novel trailer connecting means and automatic trailer brake applying means is provided by the spring 48 which is compressed by piston 46 when starting the car against an unusual degree of trailer resistance such as when starting from a stop on a steep upgrade. The yielding of the spring will cushion a sudden application of the heavy load on the engine and thereby prevent "killing" the engine as might otherwise happen.

While we have particularly described and illustrated preferred embodiments of our invention, it is to be understood that we do not intend to limit the scope of our invention by the described embodiments, since various changes and modifications may be made therein by those skilled in the art, but intend the scope of the invention to be defined by the appended claims.

What we claim is:

1. A trailer hitch and brake applying means comprising: a cylinder immovably secured to the front of the trailer frame and projecting forwardly therefrom; a bar adapted to be secured at its forward end to the back of a towing vehicle and extending at its opposite end into said cylinder; a piston within said cylinder secured to said bar; resilient means arranged between said piston and the rearward end of the cylinder and between the piston and the forward end of the cylinder, said resilient means being effective to hold said bar in normal operating position within the cylinder; a trailer brake operating stem projecting axially into position to be engaged by the end of the bar toward the trailer as the cylinder is moved forwardly over the bar when the trailer momentarily tends to overrun the towing vehicle; a movable arm of a rheostat in an electric brake system installed on the trailer connected to said stem, the engagement of said stem against the bar being effective to apply the trailer brakes; and means tending to hold said stem in forward position.

2. A trailer hitch and brake applying means comprising: a bar adapted to be connected at one end to a towing vehicle; a cylinder adapted to be rigidly secured to a trailer; a piston fixed on said bar within said cylinder and having a plurality of circumferential grooves in the surface thereof, the cylinder wall being apertured in the portion occupied by said piston; movable detent means mounted outside the cylinder and adapted to move through the apertured wall of the cylinder into engagement with the grooves in the piston; resilient means normally holding the detent means out of engagement with the grooves in the piston; means under the control of the driver of the towing vehicle for projecting said detent means into engagement with the piston; a centrally apertured elongated cap adjustably mounted on the end of said cylinder toward the towing vehicle and a centrally apertured wall at the opposite end of the cylinder, the bar slidably passing through said apertured cap and wall; springs arranged between said piston and cap and between the piston and end wall; and trailer brake applying means operated by relative movement of the bar and cylinder.

3. A trailer hitch and brake applying means comprising: a cylinder immovably secured to the front of the trailer frame and projecting forwardly therefrom; a bar adapted to be secured at its forward end to the back of a towing vehicle and extending at its opposite end into said cylinder; a piston within said cylinder secured to said bar; resilient means arranged between said piston and the rearward end of the cylinder and between the piston and the forward end of the cylinder, said resilient means being effective to hold said bar in normal operating position within the cylinder; a trailer brake operating stem projecting axially into position to be engaged by the end of the bar toward the trailer as the cylinder is moved forwardly over the bar when the trailer momentarily tends to overrun the towing vehicle; resilient means tending to hold said stem in forward position; and a compressed air trailer brake system having a main valve operated by said stem.

IVAN E. JONES.
CHARLES B. REYNOLDS.

REFERENCES CITED

The following references are of record in the file of this patent:

UNITED STATES PATENTS

| Number | Name | Date |
| --- | --- | --- |
| 1,879,981 | Hamilton | Sept. 27, 1932 |
| 2,040,728 | Bulmer | May 12, 1936 |
| 2,127,912 | Graham et al. | Aug. 23, 1938 |
| 2,133,195 | Howard | Oct. 11, 1938 |
| 2,166,452 | Therres | July 18, 1939 |
| 2,235,340 | Stuart | Mar. 18, 1941 |
| 2,388,336 | Miller | Nov. 6, 1945 |